(12) United States Patent
Al-Dahhan (10) Patent No.: US 9,193,238 B2
(45) Date of Patent: Nov. 24, 2015

(54) JOUNCE BUMPER ASSEMBLY (71) Applicant: BASF SE, Ludwigshafen (DE)

(72) Inventor: Sadiq Al-Dahhan, Dearborn, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/391,247

(22) PCT Filed: Dec. 30, 2013

(86) PCT No.: PCT/US2013/078230
§ 371 (c)(1),
(2) Date: Oct. 8, 2014

(87) PCT Pub. No.: WO2014/109923
PCT Pub. Date: Jul. 17, 2014

(65) Prior Publication Data
US 2015/0076784 A1    Mar. 19, 2015

Related U.S. Application Data (60) Provisional application No. 61/747,420, filed on Dec. 31, 2012.

(51) Int. Cl.
*B60G 11/22* (2006.01)
*F16F 1/373* (2006.01)
*F16F 1/44* (2006.01)

(52) U.S. Cl.
CPC .............. *B60G 11/22* (2013.01); *F16F 1/3732* (2013.01); *F16F 1/44* (2013.01); *B60G 2204/4502* (2013.01); *F16F 2230/02* (2013.01)

(58) Field of Classification Search
CPC ............ B60G 11/22; B60G 2204/4502; F16F 1/3732; F16F 1/44; F16F 2230/02
See application file for complete search history.

(56) References Cited

U.S. PATENT DOCUMENTS

| | | | |
|---|---|---|---|
| 2,747,166 A | 5/1956 | Hoffarth | |
| 3,099,103 A | 7/1963 | Wright | |
| 4,771,996 A | 9/1988 | Martinez, Jr. et al. | |
| 4,884,665 A | 12/1989 | Parker et al. | |
| 5,150,886 A | 9/1992 | Hamberg et al. | |
| 5,238,233 A * | 8/1993 | Hein | 267/153 |
| 5,308,104 A | 5/1994 | Charles | |
| 5,467,970 A * | 11/1995 | Ratu et al. | 267/220 |
| 6,182,953 B1 * | 2/2001 | Smith et al. | 267/220 |
| 6,186,486 B1 | 2/2001 | Gutman et al. | |
| 6,199,844 B1 | 3/2001 | McCormick et al. | |

(Continued)

FOREIGN PATENT DOCUMENTS

CA    2 527 393 A1    12/2006

OTHER PUBLICATIONS

International Search Report for Application No. PCT/US2013/078230 dated Sep. 9, 2014, 3 pages.

*Primary Examiner* — Ruth Ilan
*Assistant Examiner* — Darlene P Condra
(74) *Attorney, Agent, or Firm* — Howard & Howard Attorneys PLLC (57) ABSTRACT

A striker compresses a bumper of a jounce bumper assembly. The striker includes a contact surface configured to face the bumper of the jounce bumper assembly. The striker also includes at least one ridge extending from the contact surface. The at least one ridge is engageable with the bumper for minimizing radial expansion of the bumper at the contact surface as the bumper is compressed.

28 Claims, 9 Drawing Sheets

(56) References Cited

U.S. PATENT DOCUMENTS

| | | |
|---|---|---|
| 6,592,112 B2 | 7/2003 | Bishop et al. |
| 6,733,023 B2 * | 5/2004 | Remmert et al. ...... 280/124.179 |
| 6,820,883 B2 | 11/2004 | Lang et al. |
| 6,843,352 B2 * | 1/2005 | Jacoby et al. ............ 188/321.11 |
| 6,843,472 B2 * | 1/2005 | Henry et al. ................ 267/64.24 |
| 7,070,157 B2 | 7/2006 | Huprikar et al. |
| 7,281,705 B2 | 10/2007 | Huprikar |
| 7,416,175 B2 * | 8/2008 | Al-Dahhan .................... 267/220 |
| 8,109,491 B2 | 2/2012 | Handke et al. |
| 8,123,203 B2 | 2/2012 | Patil et al. |
| 8,210,508 B2 | 7/2012 | Hwang |
| 8,256,965 B2 | 9/2012 | Kaneko et al. |
| 2006/0043659 A1 | 3/2006 | Gofron et al. |
| 2007/0125611 A1 | 6/2007 | Zara et al. |
| 2008/0012188 A1 | 1/2008 | Dickson |
| 2009/0127759 A1 * | 5/2009 | Dickson ........................ 267/195 |
| 2012/0261868 A1 | 10/2012 | Kim et al. |

* cited by examiner

JOUNCE BUMPER ASSEMBLY

RELATED APPLICATIONS

This application is the National Stage of International Patent Application No. PCT/US2013/078230, filed on Dec. 30, 2013, which claims priority to and all the advantages of U.S. Provisional Patent Application No. 61/747,420, filed on Dec. 31, 2012, the content of which is incorporated herein by reference.

BACKGROUND OF THE INVENTION

1. Field of the Invention

The present invention generally relates to a jounce bumper assembly. More specifically, the present invention relates to a jounce bumper assembly for a vehicle.

2. Description of the Related Art

Jounce bumper assemblies have been used on vehicles to limit jounce of a suspension system. Generally, the suspension system absorbs an impact force experienced by tires of the vehicle to limit transmission of the impact force to a frame of the vehicle. For example, when the vehicle travels over a bump, components of the suspension system will jounce or collapse to absorb the impact force generated by the bump. However, when the suspension system cannot completely absorb the impact force, the components of the suspension system may impact the frame of the vehicle. Impact of the components of the suspension system with the frame can damage the frame and/or the components of the suspension system, which is not desirable.

The jounce bumper assemblies are typically positioned between the components of the suspension system and the frame of the vehicle to manage the jounce experienced by the suspension system to prevent the components of the suspension system form impacting the frame.

Generally, the jounce bumper assemblies gradually stiffen the suspension systems as the suspension system approaches an end of its jounce travel, i.e., before the components of the suspension system impact the frame of the vehicle. As such, the jounce bumper assemblies separate the components of the suspension system and the frame member of the vehicle to prevent the suspension system from directly impacting the frame member. The jounce bumper assemblies are compressed between the components of the suspension system and the frame for absorbing the impact face to limit the jounce of the suspension system.

However, as the jounce bumper assemblies are compressed, they expand radially. As the jounce bumper assemblies expand radially, the jounce bumper devices may rub against the frame of the vehicle or the component of the suspension system, which can result in noise generation, such as squeaking. Additionally, when the jounce bumper assemblies contact water or oil, a common occurrence in vehicle applications, the noise generation due to the compression of the jounce bumper assemblies is exacerbated. Noise generation by the jounce bumper assemblies is undesirable, especially in vehicle applications. As such, there is a need to prevent the jounce bumper assemblies from generating noise as the jounce bumper assemblies are compressed.

SUMMARY OF THE INVENTION AND ADVANTAGES

A striker compresses a bumper of a jounce bumper assembly. The striker includes a contact surface configured to face the bumper of the jounce bumper assembly. The striker also includes at least one ridge extending from the contact surface. The at least one ridge is engageable with the bumper for minimizing radial expansion of the bumper at the contact surface as the bumper is compressed. Minimizing radial expansion of the bumper at the contact surface minimizes noise generated by the bumper slipping along the contact surface.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
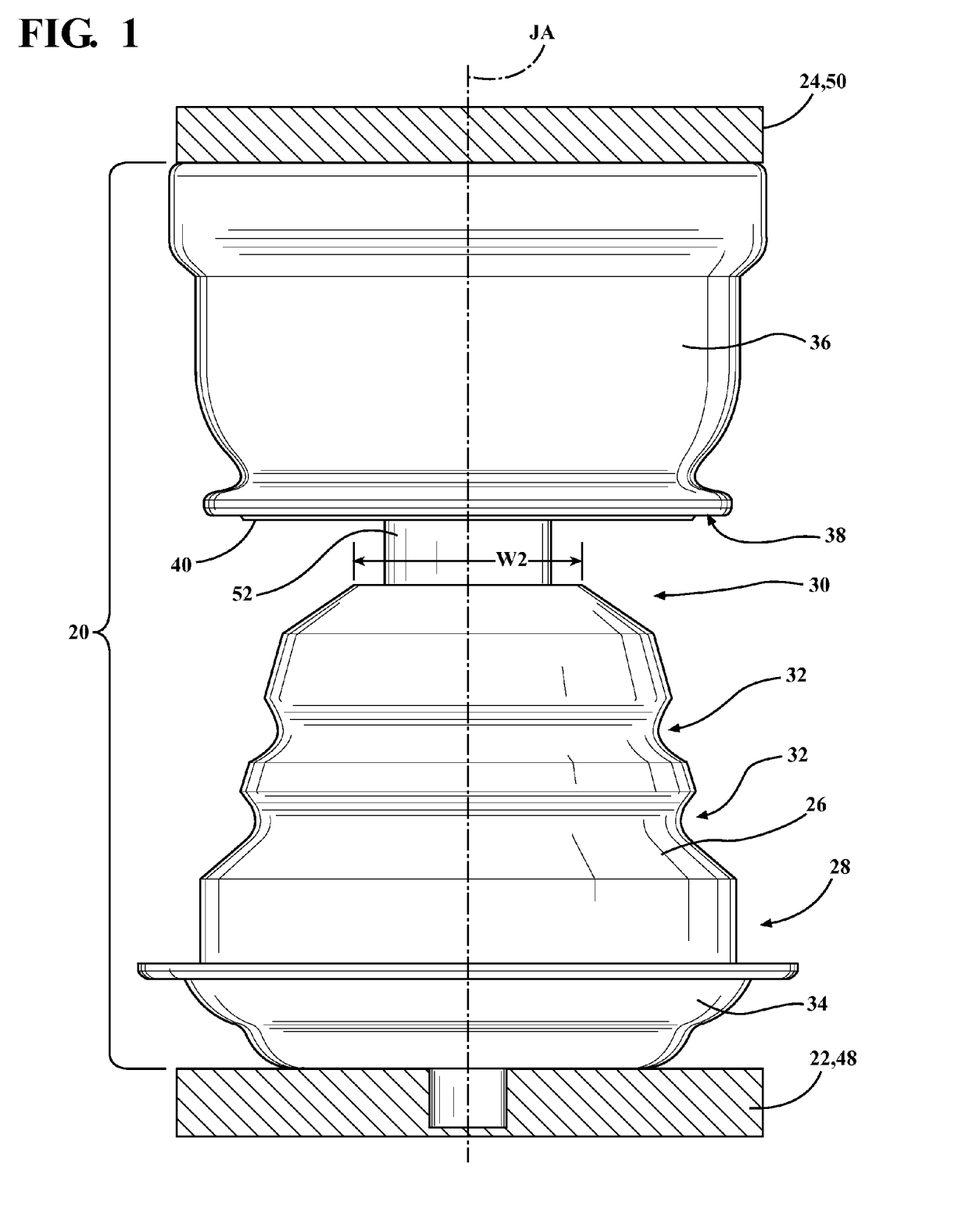
FIG. 1 is perspective view of an jounce bumper assembly disposed between a first component and a second component.

Referring to the Figures, wherein like numerals indicate like or corresponding parts throughout the several views, an jounce bumper assembly is generally shown at 20. Generally, the jounce bumper assembly 20 absorbs energy between a first component 22 and a second component 24. With reference to FIG. 1, the jounce bumper assembly 20 is used between the first and second components 22, 24 with the first and second components 22, 24 spaced from each other. The jounce bumper assembly 20 prevents the first and second components 22, 24 from directly impacting each other as at least one of the first and second components 22, 24 moves toward the other one of the first and second components 22, 24. Said differently, the jounce bumper assembly 20 is an intermediate cushion between the first and second components 22, 24.

As alluded to above, at least one of the first and second components 22, 24 is moveable toward the other one of the first and second components 22, 24. Said differently, it is possible that the first component 22 moves towards the second component 24, the second component 24 moves toward the first component 22s, and that the first and second components 22, 24 move toward each other. As such, at least one of the first and second components 22, 24 is movable along a jounce axis JA. Generally, the jounce bumper assembly 20 is in alignment with the jounce axis JA to ensure the jounce bumper assembly 20 is between the first and second components 22, 24 at the location of movement of at least one of the first and second components 22, 24. As such, the jounce bumper assembly 20 is compressed between the first and second components 22, 24 as at least one of the first and second components 22, 24 moves toward the other one of the first and second components 22, 24. In one embodiment, the second component 24 is movable toward the first component 22 along the jounce axis JA. In such an embodiment, the second component 24 contacts the jounce bumper assembly 20 as the second component 24 moves towards the first component 22.

Typically, the first and second components 22, 24 are part of a vehicle, such as a truck or a car. As the vehicle travels over a bump or hits on obstruction, such as a curb or pothole, the second component 24 jounces toward the first component 22 as a result of an impact force applied to tires of the vehicle. If the impact force is large enough, the second component 24 may contact the first component 22, which can damage either the first and second components 22, 24 or other components of the vehicle. The jounce bumper assembly 20 is positioned between the first and second components 22, 24 to absorb the jounce between the first and second components 22, 24 to prevent the second component 24 from directly impacting the first component 22.

The jounce bumper assembly 20 includes a bumper 26. The bumper 26 is compressible axially along the jounce axis JA for absorbing energy as at least one of the first and second components 22, 24 moves along the jounce axis JA. In the embodiment where the second component 24 moves along the jounce axis JA, the bumper 26 is compressible between the first and second components 22, 24 to limit jounce of the second component 24 along the jounce axis JA. Because the bumper 26 is compressible, the bumper 26 may comprise a material that is resilient, i.e., material that is able to spring back to shape after being compressed. For example, the material of the bumper 26 may be microcellular urethane or rubber.

In one embodiment, the bumper 26 has a first end 28 and a second end 30 spaced from the first end 28. The first end 28 of the bumper 26 is adapted to be coupled to the first component 22. As such, the second end 30 is spaced from the first component 22. As such, the second end 30 of the bump is contacted and compressed by the second component 24 as the second component 24 moves along the jounce axis JA toward the first component 22. However, it is to be appreciated that the first end 28 of the bumper 26 may be coupled to the second component 24, such that the bumper 26 moves with the second component 24 along the jounce axis JA. In such an embodiment, the second end 30 of the bumper 26 would be compressed by the first component 22.

Generally, the bumper 26 has a cylindrical configuration. However, is it to be appreciated that the bumper 26 can be of any suitable configuration. For example, the bumper 26 may have a rectangular configuration. Additionally, when the bumper 26 has the cylindrical configuration, a diameter of the bumper 26 may vary along a length of the bumper 26. For example, as best shown in FIG. 1, the bumper 26 may define grooves 32 for modifying a stiffness of the bumper 26.

Figure 2:
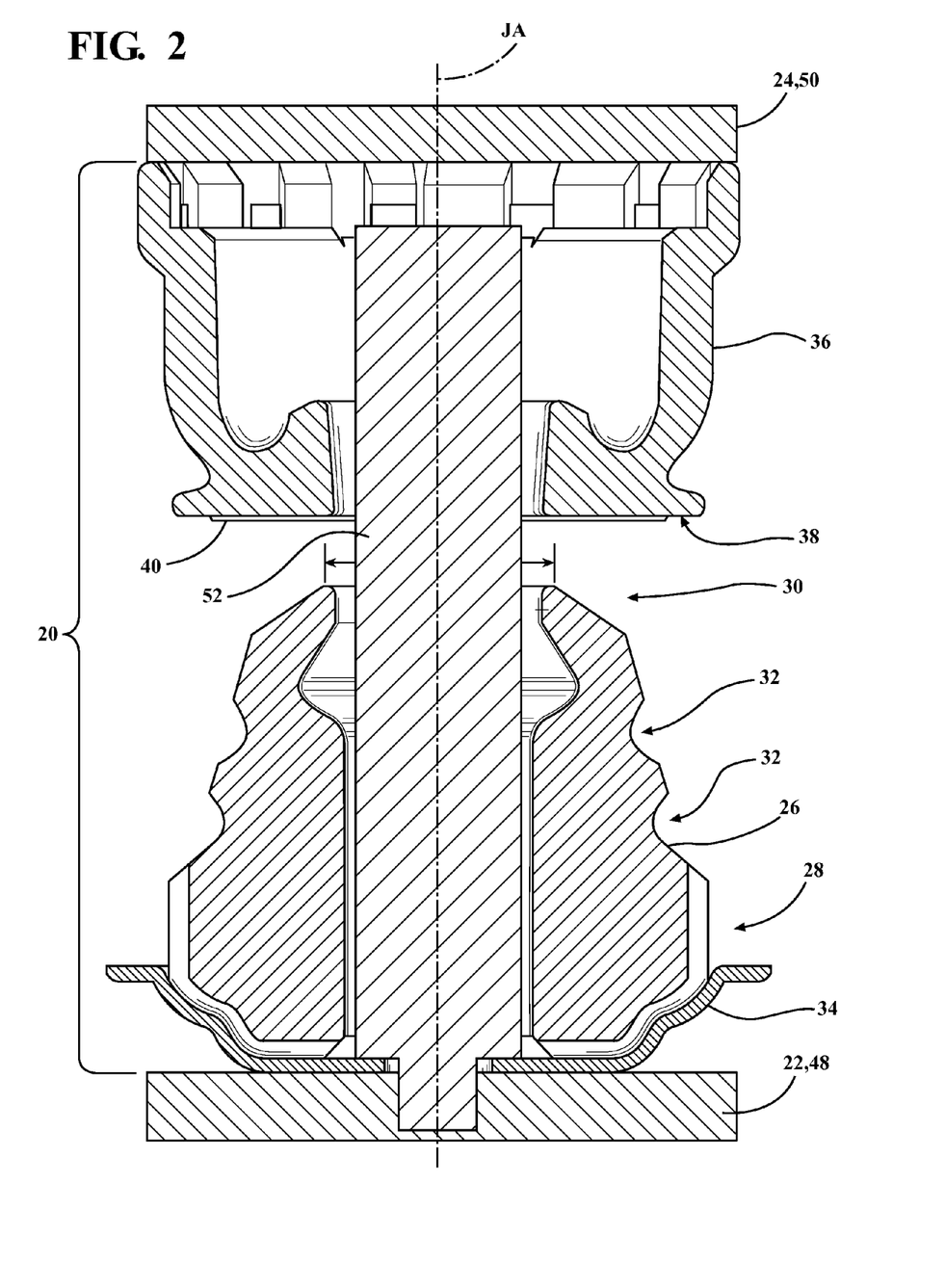
FIG. 2 is a cross-sectional view of the jounce bumper assembly.

As shown in FIGS. 1 and 2, an attachment member 34 may be employed to couple the bumper 26 to either the first or second components 22, 24. For example, the attachment member 34 may be coupled to the first component 22 with the second component 24 spaced from the attachment member 34. However, it is to be appreciated that the bumper 26 may be coupled directly to either the first or second components 22, 24 without the attachment member 34. Generally, the attachment member 34 has a U-shaped configuration in cross-section for receiving the bumper 26. Generally, the bumper 26 is disposed within the attachment member 34. The attachment member 34 provides a housing for retaining the bumper 26. As such, the attachment member 34 couples the bumper 26 to either the first or second components 22, 24.

When the second component 24 is movable toward the first component 22, the attachment member 34 is aligned with the jounce axis JA such that the second component 24 is moveable toward the attachment member 34 along the jounce axis JA. It is to be appreciated that the attachment member 34 may be coupled to the first component 22 by any suitable method. For example, the attachment member 34 may receive a fastener for coupling the attachment member 34 to the first component 22.

As the bumper 26 is compressed, movement of the second component 24 along the jounce axis JA is resisted, which limits jounce. Additionally, the compression of the bumper 26 absorbs some, if not all, of the energy applied to the second component 24 thereby preventing the second component 24 from contacting the first component 22. The bumper 26 absorbs the energy acting on the second component 24 until the bumper 26 reaches a maximum compression. Once the bumper 26 reaches a maximum compression, the remaining force is transferred to the first component 22.

The jounce bumper assembly 20 also includes a striker 36 for compressing the bumper 26 of the jounce bumper assembly 20. More specifically, the striker 36 compresses the bumper 26 as at least one of the first and second components 22, 24 move along said jounce axis JA. As such, the striker 36 is aligned with the bumper 26 along the jounce axis JA. Generally, the striker 36 is coupled to the other one of the first and second components 22, 24. For example, when the bumper 26 is coupled to the first component 22, the striker 36 is coupled to the second component 24. In such an example, the striker 36 is movable with the second component 24 for compressing the bumper 26 between the first and second components 22, 24 as the second component 24 moves along the jounce axis JA toward the first component 22.

As alluded to above, the striker 36 contacts and compresses the bumper 26 as one of the first and second components 22, 24 jounce toward each other. It is to be appreciated that the bumper 26 may move toward the striker 36, the striker 36 may move toward the bumper 26, or the bumper 26 and striker 36 may move simultaneously toward each other. However, typically, the striker 36 moves toward the bumper 26.

Figure 3:
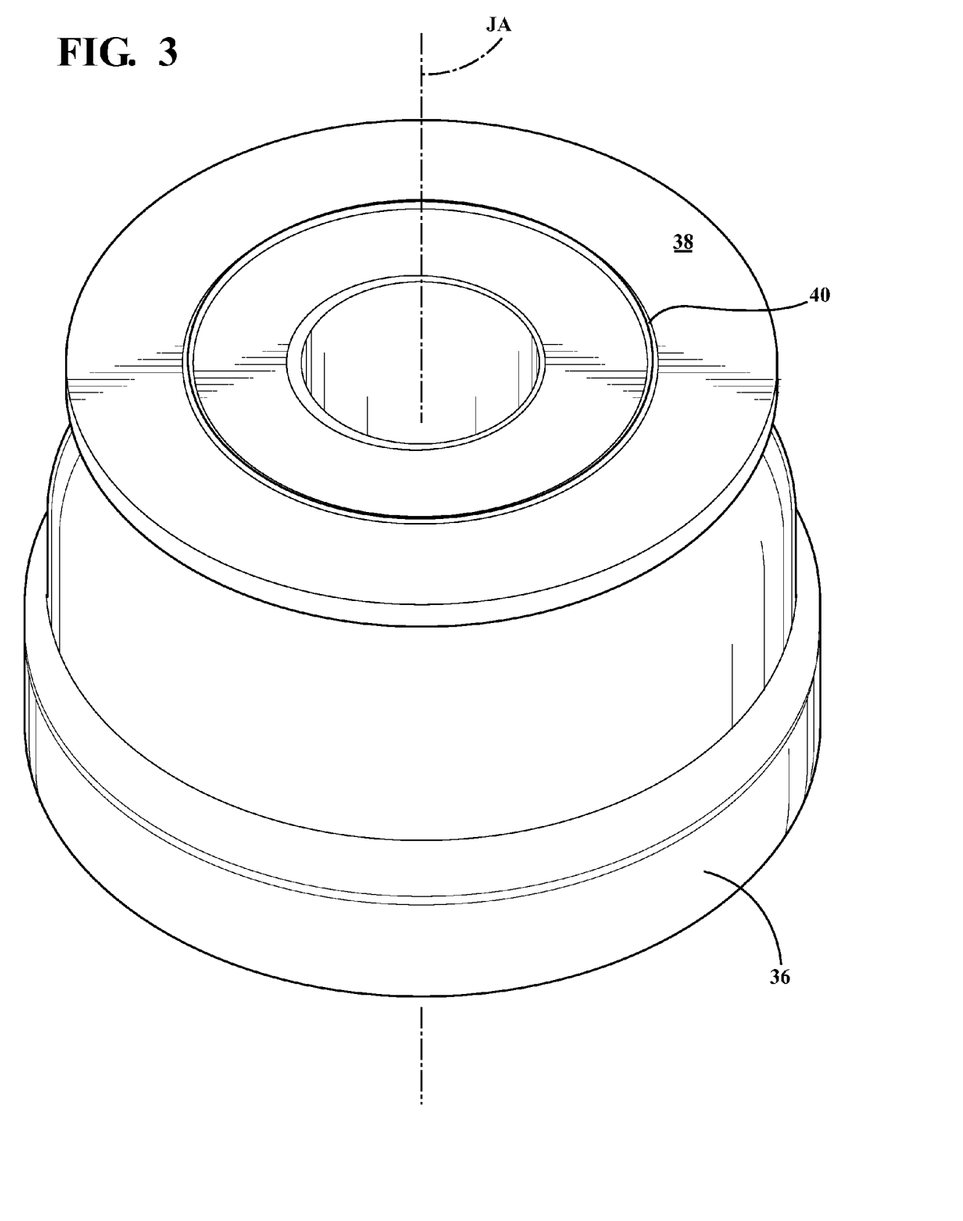
FIG. 3 is a perspective view of a striker of the jounce bumper assembly showing a ridge extending from a contact surface of the striker.

With reference to FIG. 3, the striker 36 includes a contact surface 38 for contacting and compressing the bumper 26. The contact surface 38 is configured to face the second end 30 of the bumper 26 for allowing the contact surface 38 to engage the bumper 26. The contact surface 38 of the striker 36 has at least one ridge 40 extending from the contact surface 38 of the striker 36. The ridge 40 is engageable with the bumper 26 for minimizing radial expansion of the bumper 26 at the contact surface 38 of the striker 36 as the bumper 26 is compressed. More specifically, the presence of the ridge 40 increases a coefficient of friction between the striker 36 and the bumper 26 for preventing the bumper 26 from slipping along the contact surface 38 of the striker 36 as the bumper 26 is compressed. Said differently, the ridge 40 prevents radial expansion of the bumper 26 as the bumper 26 is compressed by the striker 36. By preventing radial expansion of the bumper 26, the bumper 26 is prevented from generating noise due to slipping of the bumper 26 along the contact surface 38 of the striker 36.

Figure 4:
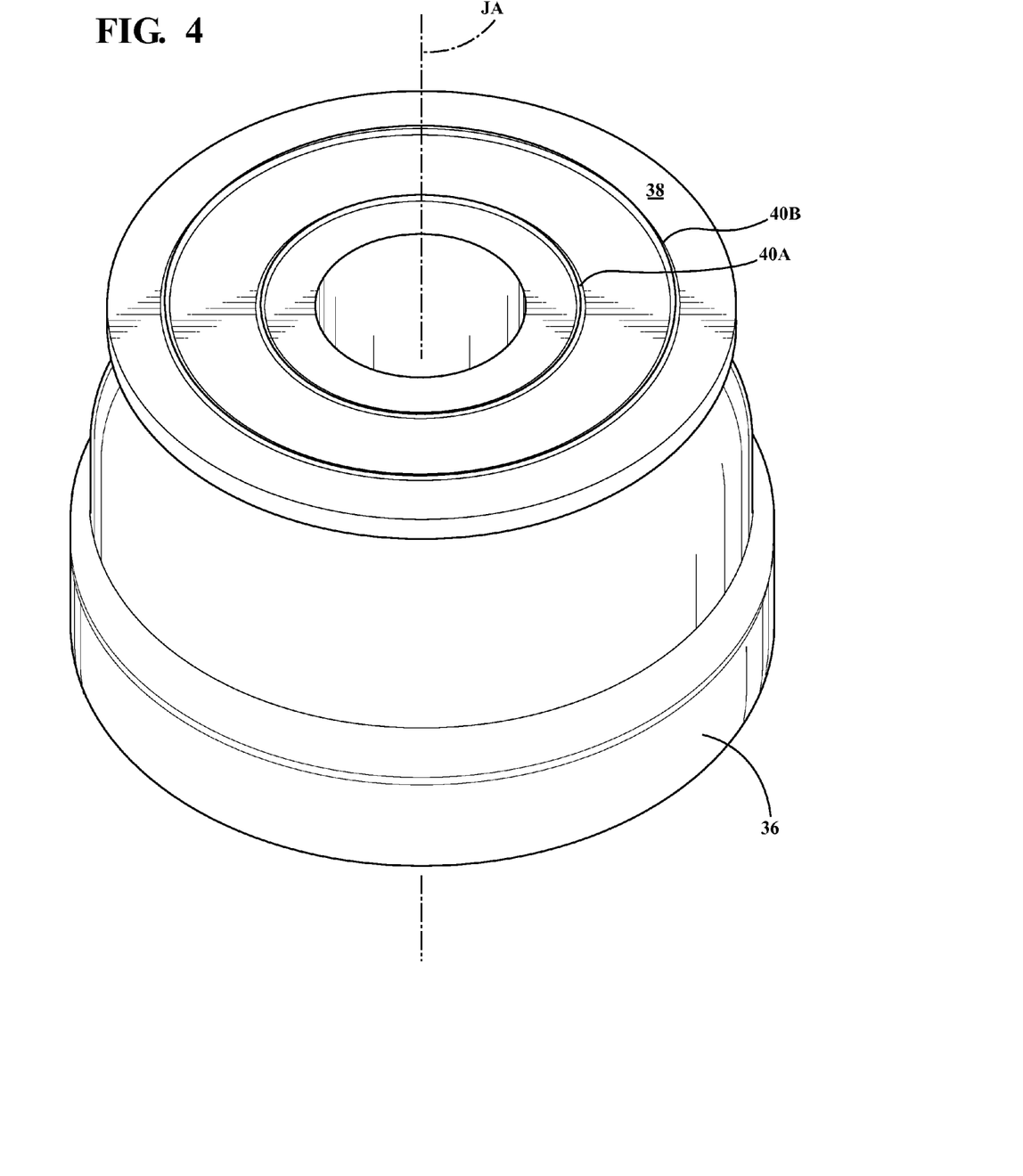
FIG. 4 is a perspective view of the striker having a first ridge and a second ridge extending from the contact surface.
Figure 5:
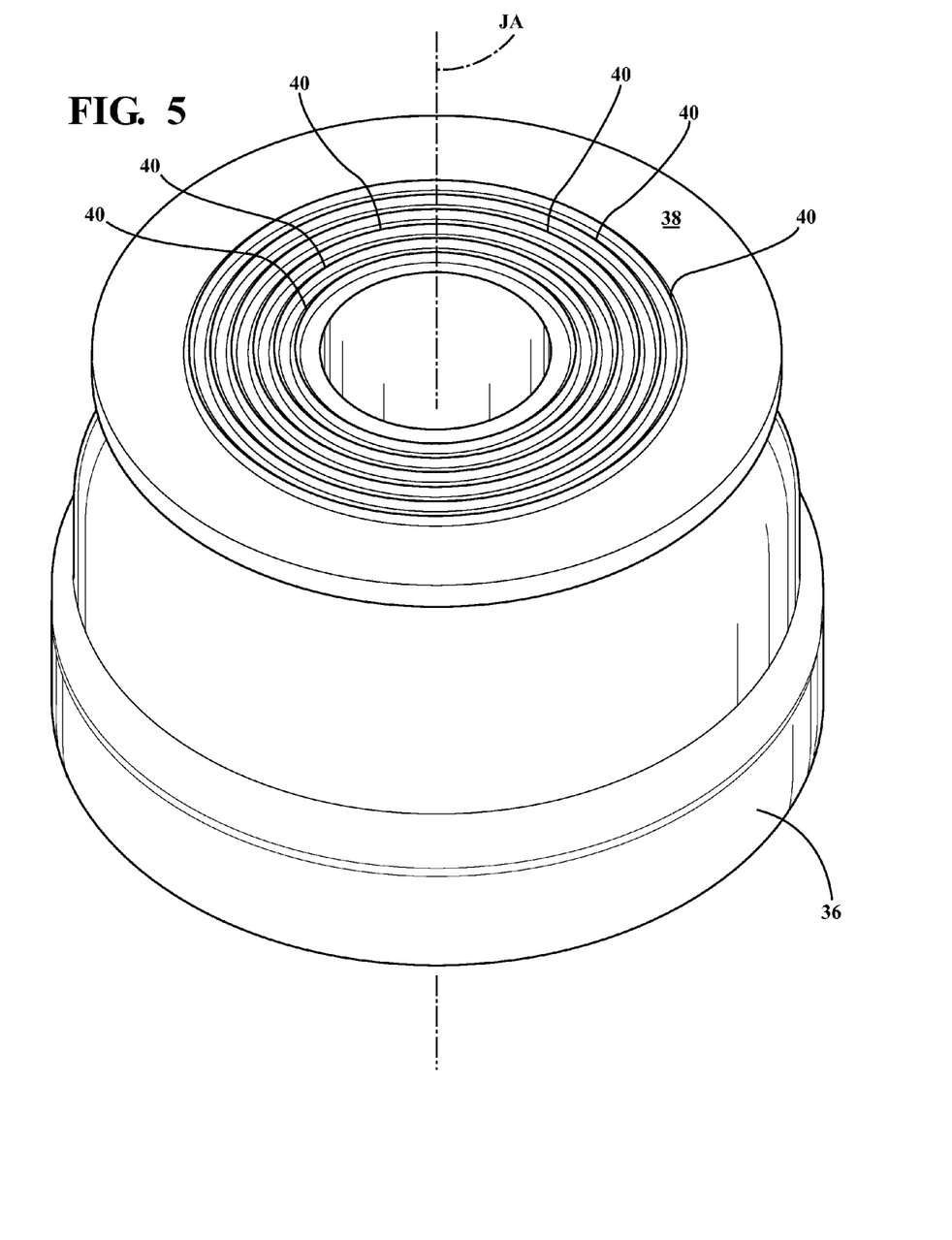
FIG. 5 is a perspective view of the striker having a plurality of ridges extending from the contact surface.

It is to be appreciated that the striker 36 may have more than one ridge 40. For example, as shown in FIG. 4, the striker 36 may include a first ridge 40A and a second ridge 40B spaced from the first ridge 40A. In another embodiment, as shown in FIG. 5, the contact surface 38 of the striker 36 has a plurality of ridges 40 each spaced from each other. For simplicity, only one ridge 40 will be described below and it is to be understood that the description of the ridge 40 below is applicable to both the at least one ridge 40, the first and second ridges 40A, 40B, and the plurality of ridges 40.

Figure 6:
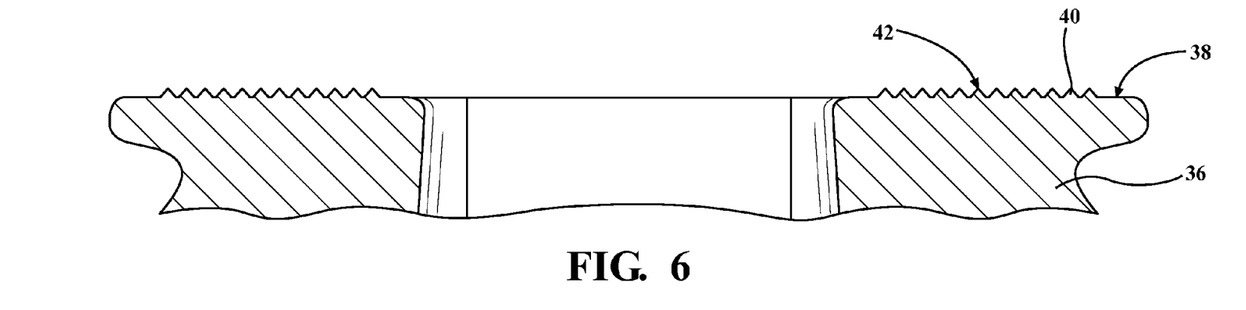
FIG. 6 is a cross-sectional view of a portion of the striker showing the ridge extending from the contact surface.

With reference to FIG. 6, the ridge 40 extends from the contact surface 38 to a terminal end 42. The terminal end 42 of the ridge 40 contacts the bumper 26 as the bumper 26 is compressed by the striker 36. The terminal end 42 of the ridge 40 may present a triangular configuration in cross-section such that the terminal end 42 of the ridge 40 is pointed. However, it is to be appreciated that the terminal end 42 of the ridge 40 may have any suitable cross-sectional configuration. For example, the ridge 40 may have a semicircular configuration.

Figure 7:
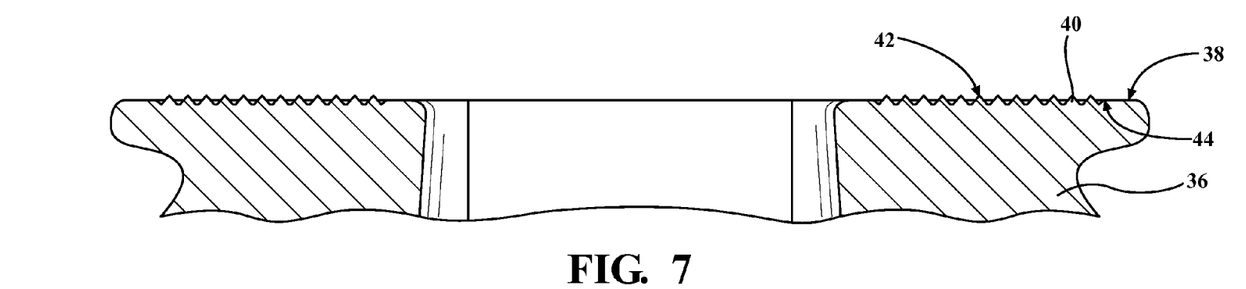
FIG. 7 is a cross-sectional view of a portion of the striker showing the ridge partially recessed into the contact surface.
Figure 8:
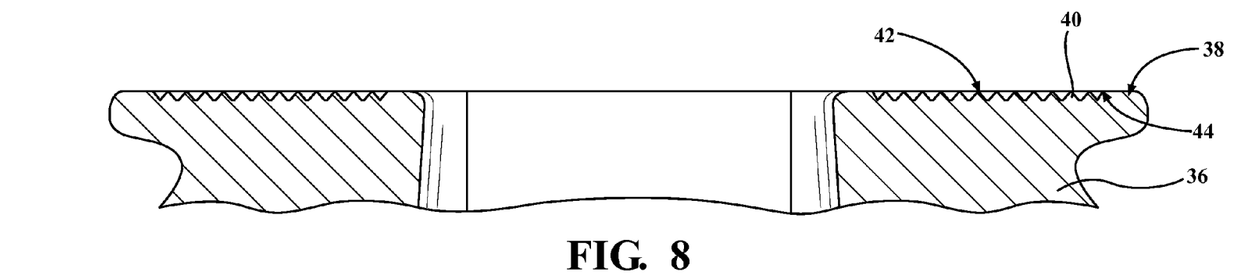
FIG. 8 is a cross-sectional view of a portion of the striker showing the ridge recessed into the contact surface.

As shown in FIG. 6, the ridge 40 may extend from the contact surface 38 of the striker 36 such that the ridge 40 is raised relative to the contact surface 38 of the striker 36. However, as shown in FIGS. 7 and 8, it is to be appreciated that the ridge 40 may be recess 44ed into the contact surface 38 of the striker. More specifically, the contact surface 38 may define a recess 44 with the ridge 40 disposed within the recess 44. The recess 44 has a depth and the ridge 40 has a height. As shown in FIG. 7, the height of the ridge 40 may be greater than the depth of the recess 44 such that the ridge 40 extends out of the recess 44. Additionally, as shown in FIG. 8, the height of the ridge 40 may be approximately equal to the depth of the recess 44 such that the terminal end 42 of the ridge 40 is flush with the contact surface 38 outside the recess 44.

Figure 9:
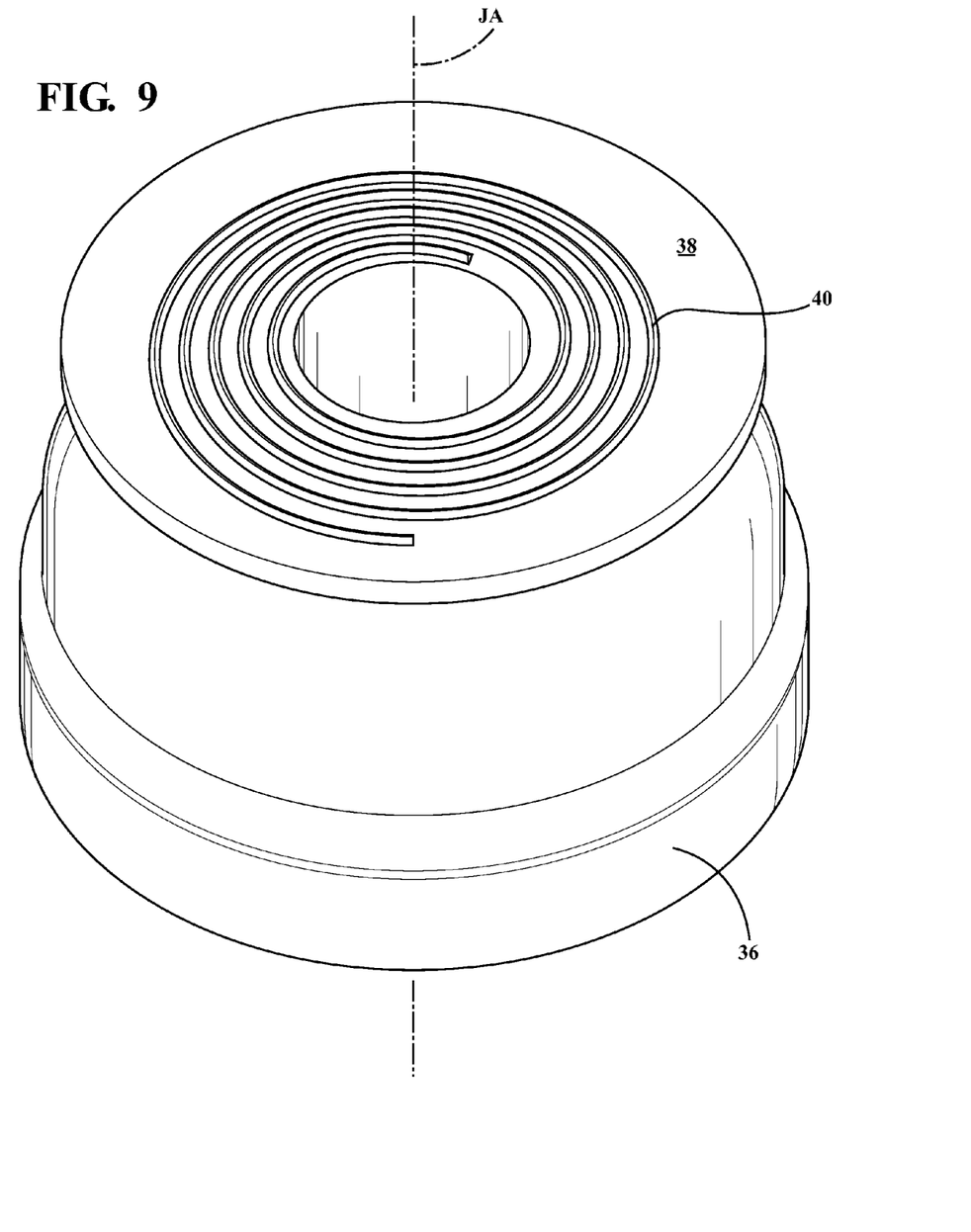
FIG. 9 is a perspective view of the striker showing the ridge presenting a spiral pattern on the contact surface.

As shown in FIGS. 3-5, 9, and 10, the ridge 40 presents a pattern on the contact surface 38 of the striker 36. For example, the ridge 40 may present a circular pattern on the contact surface 38, as shown in FIG. 3. Alternatively, the ridge 40 may present a spiral pattern on the contact surface 38, as shown in FIG. 9. When the first and second ridges 40A, 40B are present, the first and second ridges 40A, 40B present a concentric circular pattern on the contact surface 38, as shown in FIG. 4. When the plurality of ridges 40 are present, the plurality of ridges 40 may present a series of concentric circular patterns, as shown in FIG. 5. It is to be appreciated that the pattern presented by the ridges 40 is not limited to the circular pattern or the spiral pattern and any suitable pattern may be used.

Figure 10:
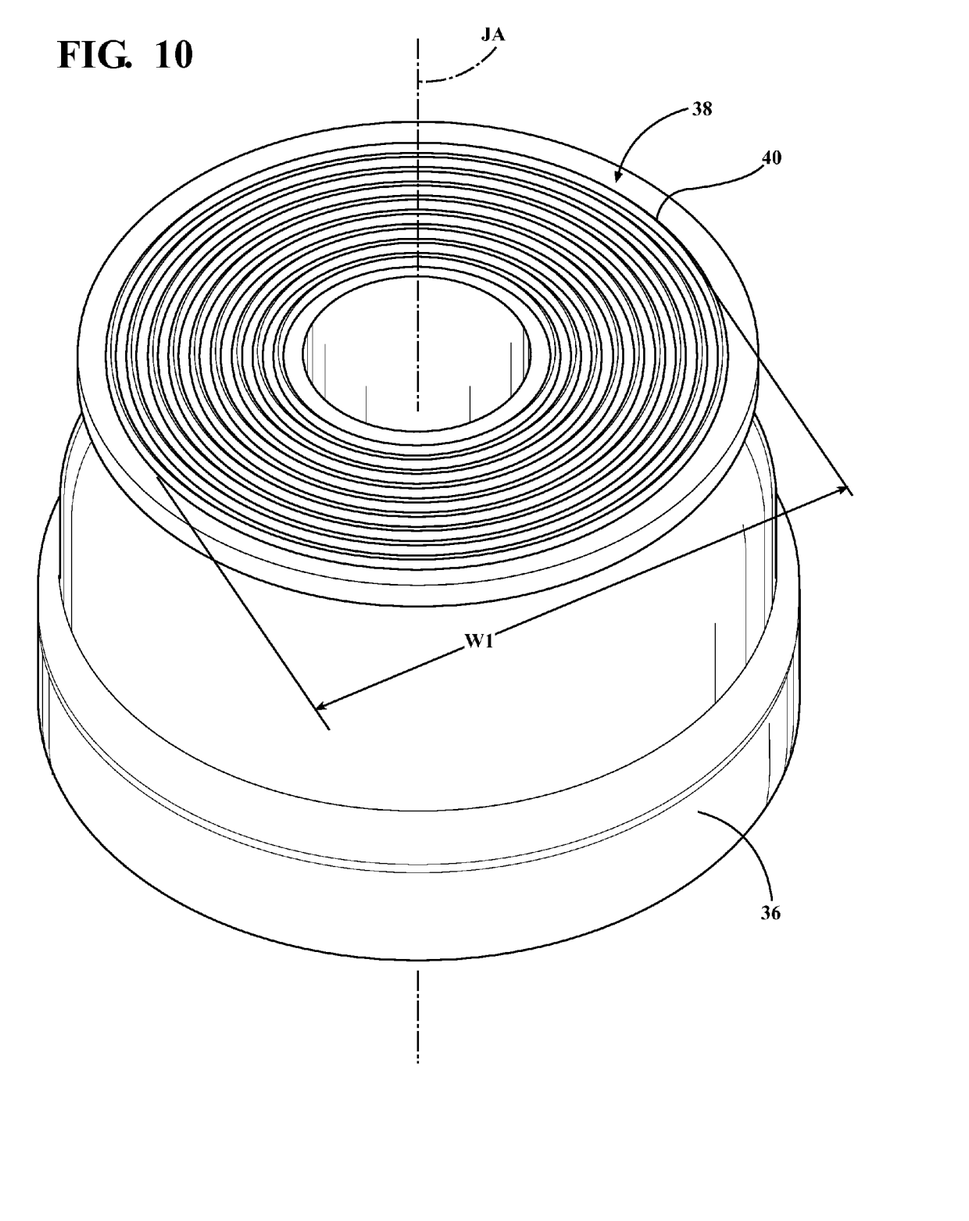
FIG. 10 is a perspective view of the striker.

With reference to FIG. 10, the pattern on the contact surface 38 of the striker 36 has a width W1. When the pattern is circular, the width W1 may be referred to as a circumference. Generally, the width W1 of the pattern is larger than a width W2 (shown in FIG. 1) of the second end 30 of the bumper 26. Said differently, the pattern on the contact surface 38 of the striker 36 is larger than the second end 30 of the bumper 26 such that the pattern is able to grip the second end 30 of the bumper 26 to prevent slipping of the second end 30 of the bumper 26 and the bumper 26 is compressed.

Figure 11:
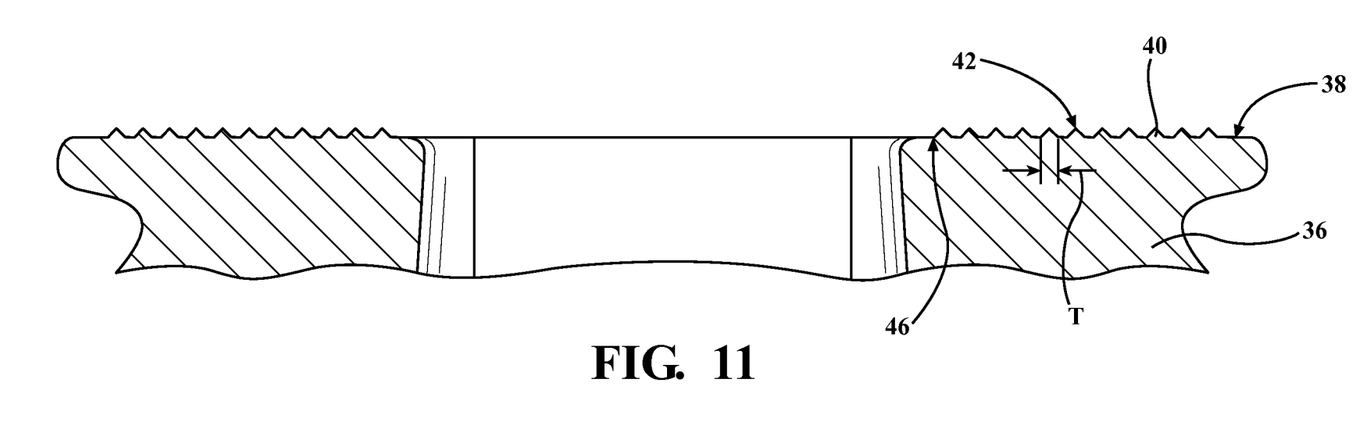
FIG. 11 is a cross-sectional view of a portion of the striker showing the thickness of the ridge.
Figure 12:
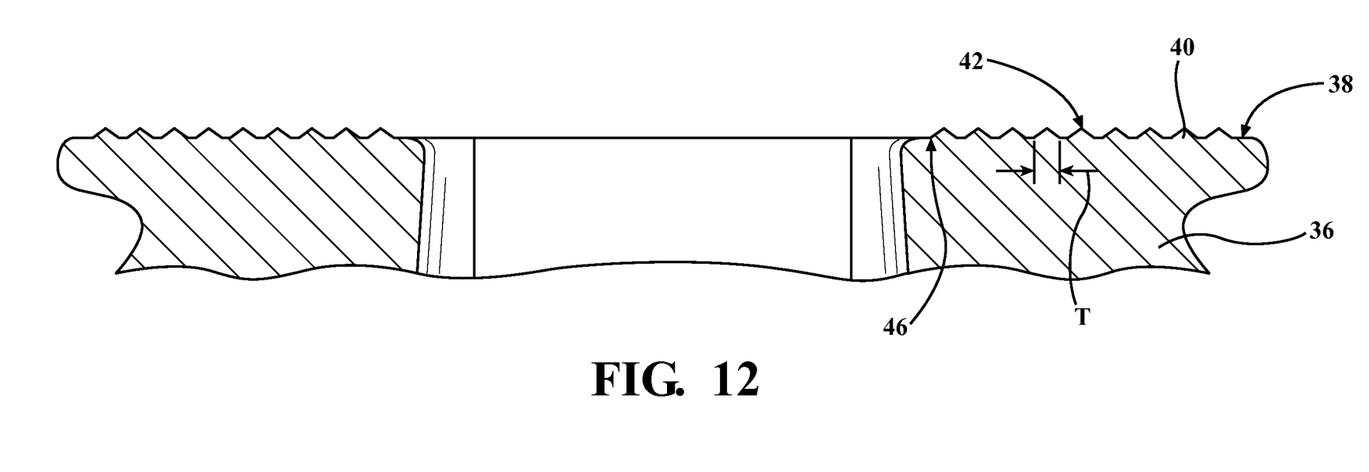
FIG. 12 is a cross-sectional view of a portion of the striker showing another thickness of the ridge.

With reference to FIGS. 11 and 12, the ridge 40 has a thickness T. When the ridge 40 has the triangular configuration in cross-section, the thickness of the ridge 40 decreases toward the terminal end 42 of the ridge 40. The ridge 40 has a base 46 at the point of contact with the contact surface 38. As shown in FIGS. 11 and 12, the width W1 of the ridges 40 at the base 46 can vary.

It is to be appreciated that the striker 36 may be a part of the first and second components 22, 24. Alternatively, the striker 36 may be a separate component from the first and second components 22, 24. For example, as shown in FIGS. 1 and 2, the striker 36 may be coupled to one of the first and second components 22, 24. Alternatively, the first or second components 22, 24 may themselves be the striker 36. The striker 36 typically comprises a material selected from the group of plastic, nylon, TPU, POM, steel, and combinations thereof.

As alluded to above, the jounce bumper assembly 20 may be used with the suspension system of the vehicle. For example, the first component 22 may be a frame member 48 of the vehicle and the second component 24 may be a strut assembly 50 of the suspension system of the vehicle. In such an embodiment, the bumper 26 may be coupled to the frame member 48 such that the bumper 26 remains stationary and a cylinder of the strut assembly 50 moves into contact with the bumper 26. Alternatively, it is to be appreciated that the bumper 26 may be coupled to the cylinder of the strut assembly 50 such that the bumper 26 moves with the cylinder. It is to be appreciated that although not fully described herein, the jounce bumper assembly 20 may be disposed between any elements of the vehicle that move toward each other.

As introduced above, when the vehicle travels over a bump, the impact force is generated. If the impact force is greater than the suspension system can absorb, the components of the suspension system, such as the cylinder of the strut assembly 50 moved toward the frame of the vehicle. For example, a piston rod 52 may collapse into the cylinder of the strut assembly 50 with the cylinder moving along the jounce axis JA toward the frame member 48 such that the bumper 26 is generally compressed between the frame member 48 and the cylinder of the strut assembly 50. More specifically, the bumper 26 is compressed by the striker 36. The greater the impact force, the greater the compression of the bumper 26. As the bumper 26 compresses, the bumper 26 will expand radially. However, the ridge 40 of the striker 36 prevents the radial expansion of the bumper 26 at the striker 36. Therefore, the ridge 40 prevents the bumper 26 from slipping along the strike thereby preventing noise generation.

It is to be appreciated that although the jounce bumper assembly 20 has been described in connection with the strut assembly 50, the jounce bumper assembly 20 can be used with other components of the suspension system, such as shocks. It is also to be appreciated that the jounce bumper assembly 20 may be used with components other than those of the suspension system.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention may only be determined by studying the following claims.

What is claimed is:

1. A striker for compressing a bumper of a jounce bumper assembly, said striker comprising a contact surface configured to face the bumper of the jounce bumper assembly, with at least one ridge extending from said contact surface, and with said at least one ridge disposed interior of an outer periphery of said contact surface and engageable with the bumper for minimizing radial expansion of the bumper at said contact surface as the bumper is compressed.

2. A striker as set forth in claim 1 wherein said at least one ridge presents a circular pattern on said contact surface.

3. A striker as set forth in claim 1 wherein said at least one ridge is further defined as a plurality of ridges with said plurality of ridges presenting a concentric circular pattern on said contact surface.

4. A striker for compressing a bumper of a jounce bumper assembly, said striker comprising a contact surface configured to face the bumper of the jounce bumper assembly, with at least one ridge extending from said contact surface, and with said at least one ridge engageable with the bumper for minimizing radial expansion of the bumper at said contact surface as the bumper is compressed; and wherein said at least one ridge presents a spiral pattern on said contact surface.

5. A striker for compressing a bumper of a jounce bumper assembly, said striker comprising a contact surface configured to face the bumper of the jounce bumper assembly, with at least one ridge extending from said contact surface, and with said at least one ridge engageable with the bumper for minimizing radial expansion of the bumper at said contact surface as the bumper is compressed; and wherein said contact surface defines a recess with said at least one ridge disposed within said recess.

6. A striker as set forth in claim 5 wherein said recess has a depth and said at least one ridge has a height with said height of said at least one ridge is greater than said depth of said recess.

7. A striker as set forth in claim 5 wherein said recess has a depth and said at least one ridge has a height with said height of said at least one ridge is approximately equal to said depth of said recess.

8. A striker for compressing a bumper of a jounce bumper assembly, said striker comprising a contact surface configured to face the bumper of the jounce bumper assembly, with at least one ridge extending from said contact surface, and with said at least one ridge engageable with the bumper for minimizing radial expansion of the bumper at said contact surface as the bumper is compressed; and wherein said at least one ridge is further defined as a first ridge and a second ridge spaced from said first ridge with said first and second ridges presenting a concentric circular pattern on said contact surface.

9. A striker for compressing a bumper of a jounce bumper assembly, said striker comprising a contact surface configured to face the bumper of the jounce bumper assembly, with at least one ridge extending from said contact surface, and with said at least one ridge engageable with the bumper for minimizing radial expansion of the bumper at said contact surface as the bumper is compressed; and wherein said at least one ridge extends from said contact surface to a terminal end with said terminal end of said striker having a triangular cross-section.

10. A jounce bumper assembly for absorbing energy between a first component and a second component, said jounce bumper assembly comprising:

a bumper having a first end adapted to be coupled to the first component and a second end spaced from said first end, with said bumper compressible axially along a jounce axis for absorbing energy as one of the first and second components moves along said jounce axis; and a striker for compressing said bumper as one of the first and second components moves along said jounce axis, with said striker aligned with said bumper along said jounce axis, with said striker comprising a contact surface facing said second end of said bumper, and with at least one ridge extending from and disposed interior of an outer periphery of said contact surface of said striker and engageable with said bumper for minimizing radial expansion of said bumper at said contact surface as said bumper is compressed.

11. A jounce bumper assembly as set forth in claim 10 wherein said bumper comprises microcellular urethane.

12. A jounce bumper assembly as set forth in claim 10 wherein said at least one ridge presents a circular pattern on said contact surface.

13. A jounce bumper assembly as set forth in claim 10 wherein said at least one ridge presents a spiral pattern on said contact surface.

14. A jounce bumper assembly as set forth in claim 10 wherein said contact surface defines a recess having a depth with said at least one ridge disposed within said recess and said at least one ridge has a height with said height of said at least one ridge is greater than said depth of said recess.

15. A jounce bumper assembly as set forth in claim 10 wherein said contact surface defines a recess having a depth with said at least one ridge disposed within said recess and said at least one ridge has a height with said height of said at least one ridge is approximately equal to said depth of said recess.

16. A jounce bumper assembly as set forth in claim 10 wherein said at least one ridge is further defined as a first ridge and a second ridge spaced from said first ridge with said first and second ridges presenting a concentric circular pattern on said contact surface.

17. A jounce bumper assembly as set forth in claim 10 wherein said at least one ridge is further defined as a plurality of ridges with said plurality of ridges presenting a concentric circular pattern on said contact surface.

18. A jounce bumper assembly as set forth in claim 10 wherein said at least one ridge extends from said contact surface to a terminal end with said terminal end of said striker having a triangular cross-section.

19. A suspension system for a vehicle comprising:

a first component;

a second component spaced from and movable toward said first component along a jounce axis; and a jounce bumper assembly for absorbing energy between said first and second components with said jounce bumper assembly comprising;

a bumper having a first end adapted to be coupled to the first component and a second end spaced from said first end, with said bumper compressible axially along a jounce axis for absorbing energy as one of the first and second components moves along said jounce axis; and a striker for compressing said bumper as one of the first and second components moves along said jounce axis, with said striker aligned with said bumper along said jounce axis, with said striker comprising a contact surface facing said second end of said bumper, and with at least one ridge extending from and disposed interior of an outer periphery of said contact surface of said striker and engageable with said bumper for minimizing radial expansion of said bumper at said contact surface as said bumper is compressed.

20. A suspension system as set forth in claim 19 wherein said bumper comprises microcellular urethane.

21. A suspension system as set forth in claim 19 wherein said at least one ridge presents a circular pattern on said contact surface.

22. A suspension system as set forth in claim 19 wherein said at least one ridge presents a spiral pattern on said contact surface.

23. A suspension system as set forth in claim 19 wherein said contact surface defines a recess having a depth with said at least one ridge disposed within said recess and said at least one ridge has a height with said height of said at least one ridge is greater than said depth of said recess.

24. A suspension system as set forth in claim 19 wherein said contact surface defines a recess having a depth with said at least one ridge disposed within said recess and said at least one ridge has a height with said height of said at least one ridge is approximately equal to said depth of said recess.

25. A suspension system as set forth in claim 19 wherein said at least one ridge is further defined as a first ridge and a second ridge spaced from said first ridge with said first and second ridges presenting a concentric circular pattern on said contact surface.

26. A suspension system as set forth in claim 19 wherein said at least one ridge is further defined as a plurality of ridges with said plurality of ridges presenting a concentric circular pattern on said contact surface.

27. A suspension system as set forth in claim 19 wherein said at least one ridge extends from said contact surface to a terminal end with said terminal end of said striker having a triangular cross-section.

28. A suspension system as set forth in claim 19 wherein said first component is a frame member of said vehicle and said second component is a strut assembly.

\* \* \* \* \*